United States Patent
Cester

(10) Patent No.: US 7,352,594 B2
(45) Date of Patent: Apr. 1, 2008

(54) STAGE FOR RECTIFYING A THREE-PHASE CURRENT

(75) Inventor: Christophe Cester, Blagnac (FR)

(73) Assignee: Technofan, Blagnac (FR)

( * ) Notice: Subject to any disclaimer, the term of this patent is extended or adjusted under 35 U.S.C. 154(b) by 153 days.

(21) Appl. No.: 11/275,466

(22) Filed: Jan. 6, 2006

(65) Prior Publication Data

US 2006/0152949 A1    Jul. 13, 2006

(30) Foreign Application Priority Data

Jan. 7, 2005 (FR) .................. 05 00184

(51) Int. Cl.
*H02M 7/06* (2006.01)
(52) U.S. Cl. .......................... 363/5; 333/181
(58) Field of Classification Search .............. 363/34, 363/126, 125, 84, 37, 65, 67, 95, 98; 323/355, 323/358, 361, 363; 336/170, 5, 73, 115, 336/130, 137, 155, 182, 214, 220
See application file for complete search history.

(56) References Cited

U.S. PATENT DOCUMENTS

| | | | |
|---|---|---|---|
| 4,317,039 A * | 2/1982 | Romandi | 378/105 |
| 5,726,611 A * | 3/1998 | Takagi et al. | 333/181 |
| 6,151,228 A * | 11/2000 | Miyazaki et al. | 363/48 |
| 6,459,596 B1 * | 10/2002 | Corzine | 363/37 |
| 6,617,814 B1 * | 9/2003 | Wu et al. | 318/448 |
| 6,794,929 B2 * | 9/2004 | Pelly | 327/552 |
| 2002/0186112 A1 * | 12/2002 | Kamath | 336/5 |

FOREIGN PATENT DOCUMENTS

FR    2 842 962 A1    1/2004

OTHER PUBLICATIONS

Bang Sup Lee et al: "An Optimized Active Interphase Transformer for Auto-Connected 12-pulse Rectifiers Results in Clean Input Power", Applied Power Electronics Conference and Exposition, 1997. APEC '97 Conference Proceedings 1997, Twelfth Annual Atlanta, GA, USA Feb. 23-27, 1997, New York, NY USAA, IEEE, vol. 2, Feb. 23, 1997, pp. 666-671.

* cited by examiner

*Primary Examiner*—Bao Q. Vu
*Assistant Examiner*—Nguyen Tran
(74) *Attorney, Agent, or Firm*—Sughrue Mion, PLLC

(57) ABSTRACT

The rectification stage (18) having:
an autotransformer (40) for twelve-phase rectification;
two rectifiers (50A, 50B) each of which is connected at the input to three separate phases of the autotransformer (40);
two interphase inductors (51A, 51B); and
a filtration stage (54) which receives at the input the centre points of the two interphase inductors (51A, 51B).

The two interphase inductors (51A, 51B) have a common core (52) which defines a magnetic circuit and all the windings of the two interphase inductors (51A, 51B) are wound on this common core for the magnetic coupling thereof.

8 Claims, 4 Drawing Sheets

STAGE FOR RECTIFYING A THREE-PHASE CURRENT

TECHNICAL FIELD

The present invention relates to a stage for rectifying a three-phase current, of the type comprising:

- an autotransformer having pulsed flow for twelve-phase rectification and having, at the output, six phases which form a six-phase power supply network;
- two rectifiers, each of which is connected at the input to three separate phases of the six-phase power supply network and which each have two polarised output terminals;
- two interphase inductors having two input terminals which are connected to the output terminals of the two rectifiers having the same polarity and a centre output point, each interphase inductor comprising two windings which are coupled magnetically and which are arranged so that the flows created by the continuous components of the currents which pass through these windings compensate for each other, two terminals of the windings being connected to each other in order to form the centre output point and the other two terminals constituting the input terminals; and
- a filtration stage which receives at the input the centre points of the two interphase inductors.

BACKGROUND TO THE INVENTION

In some installations, loads, such as, for example, electric motors, are supplied from a local electrical power supply network.

This is, for example, the case in an aircraft in which the aircraft is equipped with an internal three-phase network. This network is supplied from alternators which are associated with the reactors of the device. The frequency of the electric current over the power supply network can be variable.

In order to ensure the supply of a load, it is known to provide, between the load and the power supply network, a supply interface which provides rectification of the voltage originating from the power supply network, then processing of the electric current in order to supply the connected load in a satisfactory manner.

In particular, an interface of this type advantageously comprises a rectification stage involving an autotransformer for multi-phase rectification, and in particular a twelve-phase autotransformer.

An interface of this type and a rectification stage are described, for example, in document FR-2 842 962.

The autotransformer constitutes a filter which allows the harmonics generated over the power supply network by the rectification means to be limited. A filter of this type in particular allows some harmonics to be completely eliminated from the absorbed current and the other harmonics to be reduced.

With a rectification stage of this type, however, it has been found that, although the harmonics are reduced owing to the presence of the autotransformer, they are still present.

The object of the invention is to provide a rectification stage having improved levels of efficiency in terms of harmonic rejection.

SUMMARY OF THE INVENTION

To this end, the invention relates to a stage for rectifying a three-phase current of the above-mentioned type, characterised in that the two interphase inductors comprise a common core which defines a magnetic circuit and all the windings of the two interphase inductors are wound on this common core for the magnetic coupling thereof.

According to specific embodiments, the rectification stage comprises one or more of the following features:

- the two interphase inductors are wound one around the other in accordance with the common core, the windings of the same inductor being interwoven; and
- the windings of two separate interphase inductors are wound and connected so that the frequency of the flow in the magnetic circuit is equal to three times the frequency of the electrical network which supplies the rectification stage.

The invention also relates to a supply interface which comprises a stage for rectifying a three-phase current as above and a stage for processing the rectified signal.

The invention finally relates to a transport means which comprises an electrical power supply network and at least one load which is connected to the electrical power supply network via a supply interface as defined above.

BRIEF DESCRIPTION OF THE DRAWINGS

The invention will be better understood from a reading of the following description, given purely by way of example and with reference to the drawings, in which.

DESCRIPTION OF PREFERRED EMBODIMENTS

Figure 1:
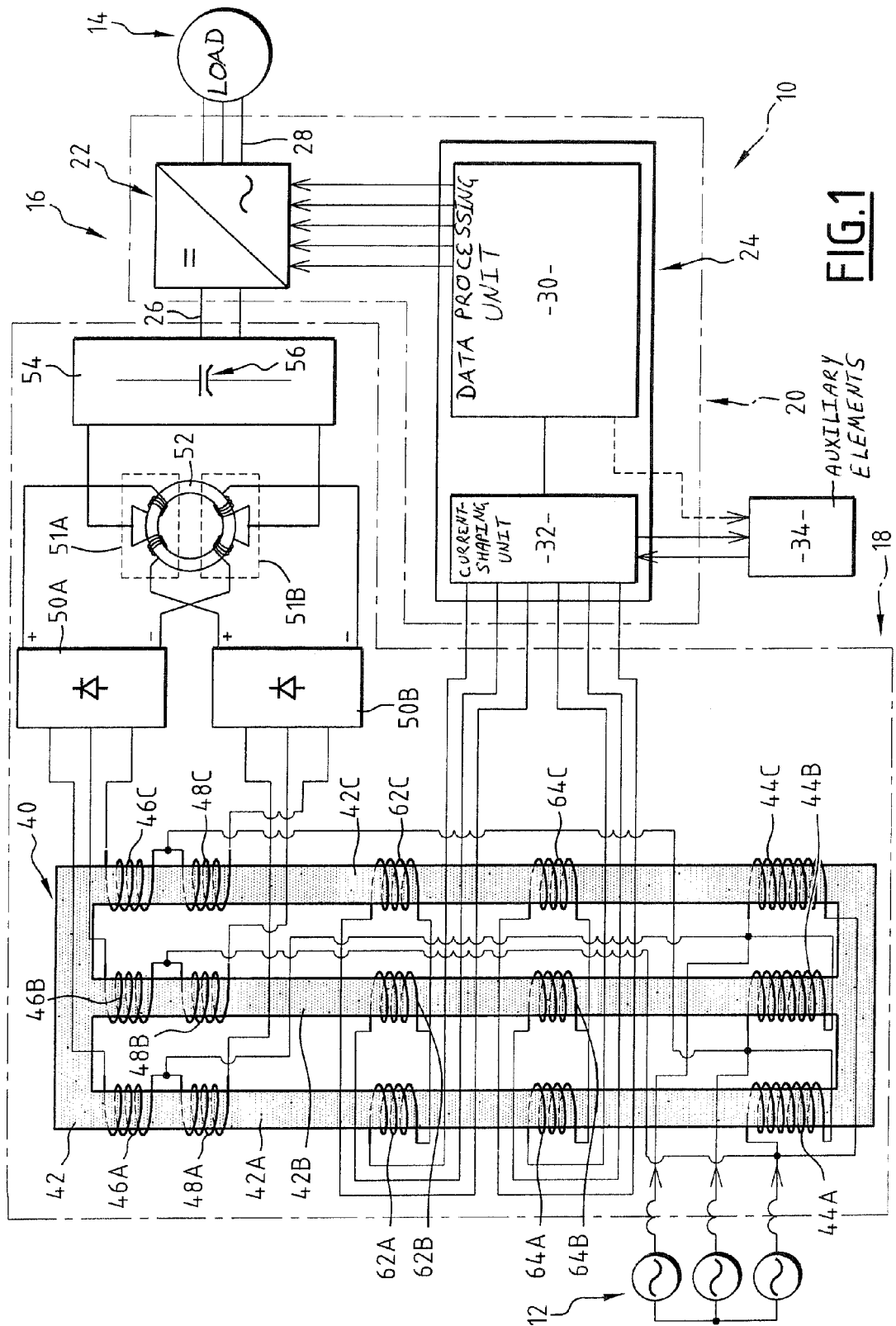
FIG. 1 is a schematic view of an electrical installation of an aircraft incorporating a supply interface and a stage for rectifying a load according to the invention.

The installation 10 illustrated is supposed to be incorporated in a transport means and in particular in an aircraft.

This installation comprises a power supply network 12, a load 14 which is connected to the power supply network and an interface 16 which is interposed between the power supply network 12 and the load 14 in order to ensure that the load is supplied.

The load 14 is constituted, for example, by a three-phase electric motor. The power supply network 12 is constituted, for example, by a three-phase power supply network of variable frequency, the nominal voltage being, for example, 115/200 volts.

The supply interface comprises a rectification stage 18 which is connected to the power supply network 12, and a stage 20 for processing the supply current, the output of which stage is connected to the load 14. The processing stage 20 is connected to the output of the rectification input stage 18 for the supply thereof.

More precisely, the stage 20 for processing the current is constituted, in the example in question, by an inverter having a power module 22 and a control module 24.

The power module 22 is suitable for receiving, at the input designated 26, a continuous current and for providing, at the output 28, a three-phase supply current for the load 14. The power module 22 is capable of shaping the supply current of the load 14 based on control commands received from the control module 24. To this end, the control module 24 comprises a data processing unit 30 which is capable of producing and providing the control commands for the power module 22.

The control module 24 further comprises a unit 32 for shaping the current, which unit is suitable for receiving at the input a low-voltage three-phase alternating current and supplying at the output a low-voltage current which is suitable for supplying the data processing unit 30. Furthermore, the unit 32 for shaping the current is capable of ensuring the supply of auxiliary elements 34 which may or may not be controlled from the data processing unit 30 of the control module 24.

The rectification stage 18 comprises an autotransformer 40 having pulsed flow for twelve-phase rectification.

A rectification stage of this type is described in general terms in the article "Polyphase Transformer Arrangements with Reduced kVA Capacities for Harmonic Current Reduction in Rectifier-Type Utility Interface" (IEEE Transactions on Power Electronics, vol. 11, No. 5, September 1996, pages 680-690). A person skilled in the art can thus refer to this document for the construction details and only the elements particular to the invention will be described in detail here.

The autotransformer 40 comprises a metal core 42 which forms two overlapping magnetic loops which are delimited by three branches 42A, 42B, 42C which are connected to each other by means of the ends thereof.

A primary winding 44A, 44B, 44C which is connected to each phase of the power supply network 12 is wound on each branch 42A, 42B, 42C. These three windings are connected in the form of a triangle so that the ends of each winding connected to the power supply network 12 are connected to the output end of another winding.

Furthermore, each branch 42A, 42B, 42C comprises two secondary windings 46A, 46B, 46C and 48A, 48B, 48C which are connected in pairs in series. These windings are each connected from their centre point to a phase of the power supply network 12.

The output ends of each pair of secondary windings in series constitute the six phases of a six-phase power supply network which is formed at the output of the autotransformer 40.

The outputs of the secondary windings which are associated in groups of three are connected to the inputs of two diode bridges 50A, 50B which form rectifiers which each have a + terminal and a − terminal at the output.

The outputs of the diode bridges 50A and 50B having the same polarity are connected to the two input terminals of two interphase inductors 51A, 51B. Each interphase inductor comprises two inputs and a single output. In this manner, the two inputs of the interphase inductor 51A are connected to the + terminals of the two diode bridges 50A, 50B whilst the two inputs of the interphase inductor 51B are connected to the − terminals of the two diode bridges 50A, 50B.

Each interphase inductor comprises two windings which are designated 51A1, 51A2 and 51B1 and 51B2 for the interphase inductors 51A, 51B, respectively. All the windings have the same number of turns and the same cross-section. The windings of the same interphase inductor are magnetically coupled to each other so that the flows produced oppose each other. The two windings are thus connected together from one end by a centre point of the interphase inductor in order to form an output, the other two ends of the windings forming the inputs of the interphase inductor.

According to the invention, the four windings of the two interphase inductors are carried by a common magnetic core and are therefore arranged in series on the same magnetic circuit which provides the magnetic coupling thereof.

Figure 2:
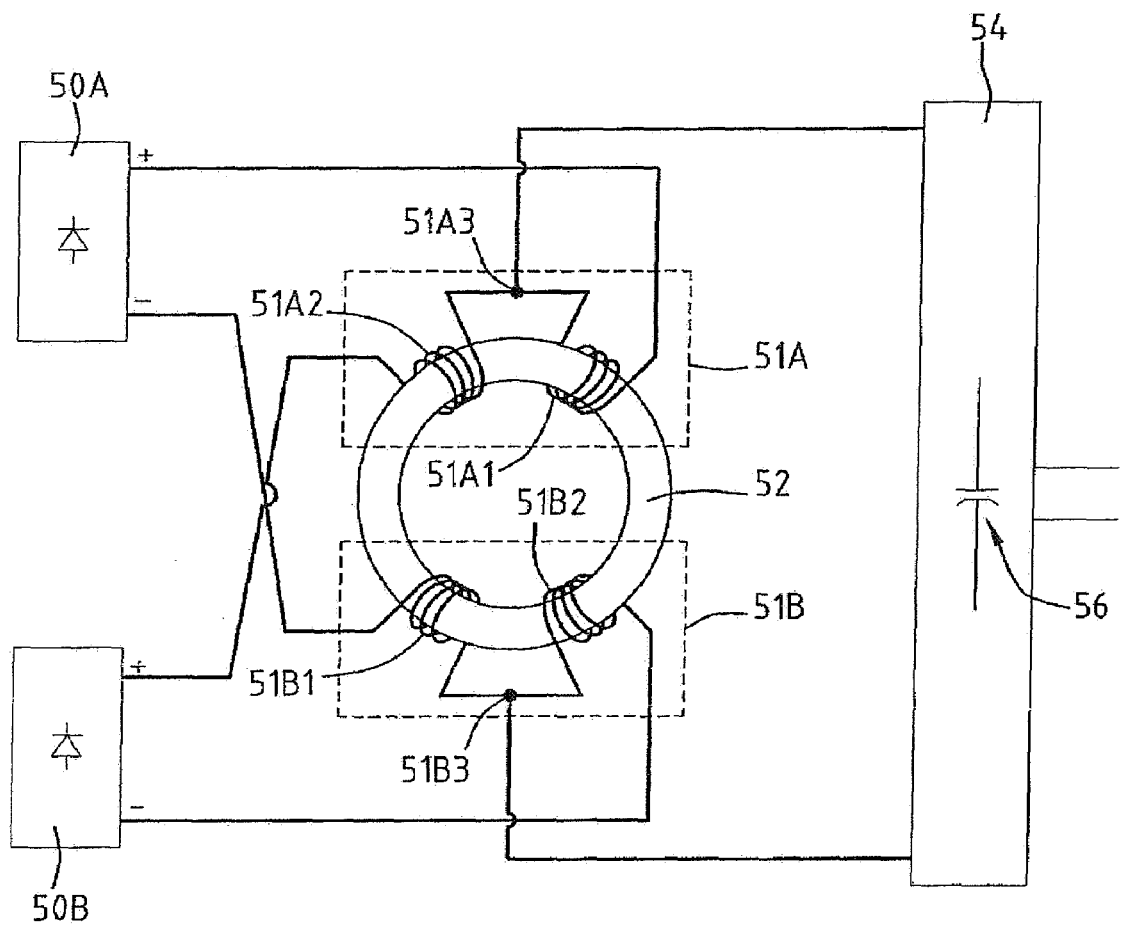
FIG. 2 is an enlarged view of the interphase inductors of the rectification stage of FIG. 1.

More precisely, and as illustrated in detail in FIG. 2, the two interphase inductors comprise a common toroidal core 52 formed from a ferromagnetic material. This core has, for example, the shape of a torus having a rectangular cross-section.

Each inductor extends over the whole periphery of the core 52, the two inductors being wound one around the other, with an electrical insulator being interposed between the two.

Furthermore, the two windings of the same inductor are wound and interwoven, the two wires constituting the two windings being wound simultaneously and in the same direction.

The windings 51A1 and 51A2 of the interphase inductor 51A are thus wound in the same direction on the core 52 and are connected to each other in series by means of a centre point 51A3 which forms the output of the interphase inductor 51A. The other two ends of the windings are connected to the + terminals of the diode bridges 50A, 50B. The windings 51A1 and 51A2 are arranged in such a manner that the flows generated by the continuous components of the currents which pass through these windings are opposed.

The structure of the interphase inductor 51B is identical to that of the interphase inductor 51A. It is arranged above the interphase inductor 51A on the torus 52 and also has a centre point 51B3 formed at the connection between the two windings 51B1 and 51B2, the ends of the two windings being connected to the − outputs of the two diode bridges 50A, 50B.

The windings 51A1, 51B1, on the one hand, and 51A2, 51B2, on the other hand, of the two interphase inductors are arranged and connected on the core 52 so that the frequency of the flow in the magnetic circuit is equal to three times the supply frequency from the network 12. To this end, and as indicated in FIG. 2, the windings of the two interphase inductors are wound in the same direction.

The outputs 51A3 and 51B3 of the two interphase inductors 51A, 51B are connected to the input of a filtration stage 54 in which an energy storage capacitor 56 is integrated.

The input 26 of the power module 22 is connected to the output of the filtration stage 54 in order to supply continuous current to the power module.

Furthermore, the control module 24 of the stage 20 for processing the current is supplied with low-voltage current from a group of supplementary windings which are wound around the branches 42A, 42B, 42C of the autotransformer.

More precisely, the autotransformer 40 has, on each of its branches 42A, 42B, 42C, three windings 62A, 62B, 62C which are connected to each other in a star-like manner from a first common end, the other end of each winding being connected to the unit 32 for shaping the current of the control module 24. These windings all have the same number of turns.

Furthermore, three other supplementary windings 64A, 64B, 64C are wound around the branches 42A, 42B, 42C. These each have an equal number of turns which is different from the number of turns of the windings 62A, 62B, 62C. These windings are also connected in a star-like manner and connected to the module 32.

When the autotransformer 40 is supplied from the power supply network 12, a portion of the power originating from the network is converted into continuous current and transmitted to the power module 22 in order to be shaped in order to supply the motor 14.

Furthermore, a portion of the energy is transmitted to the windings 62A, 62B, 62C and 64A, 64B, 64C owing to their magnetic coupling with the primary windings. The three-phase current originating in these windings is applied to the unit 32 in order to ensure the autonomous supply of the control module 24.

These two series of three windings ensure that two different alternating voltages are provided for the control module 24. After the currents received have been shaped, these two currents ensure the supply of the data processing unit 30 of the control module 24.

In a variant, the supply of the control module 24 of the processing stage 20 is provided by an independent external supply of the autotransformer 40.

It should be noted that the magnetic coupling of the two interphase inductors 51A, 51B, in particular with them being formed on the same common magnetic core, allows specific harmonics of the current absorbed at the input of the rectification stage 18 to be reduced, thus improving the efficiency of the rectification stage by reducing the harmonic rejection rate.

Figure 3A:
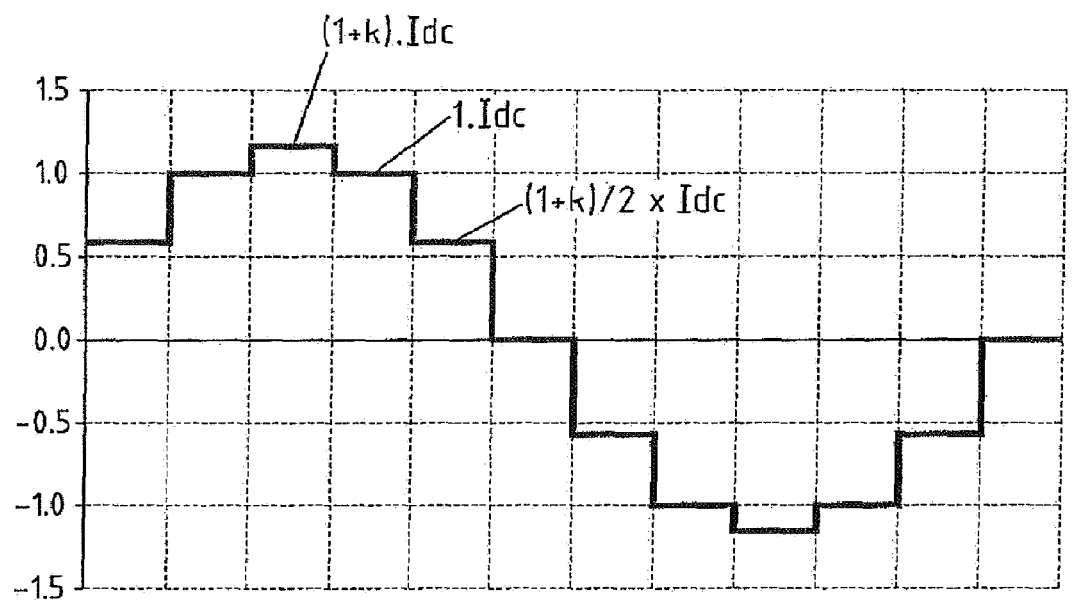
FIGS. 3A and 3B are graphic illustrations of the development of the current of a phase of the power supply network as a function of time, over a period of time, in an installation according to the prior art (FIG. 3A) and in an installation according to the invention (FIG. 3B), respectively.
Figure 3B:
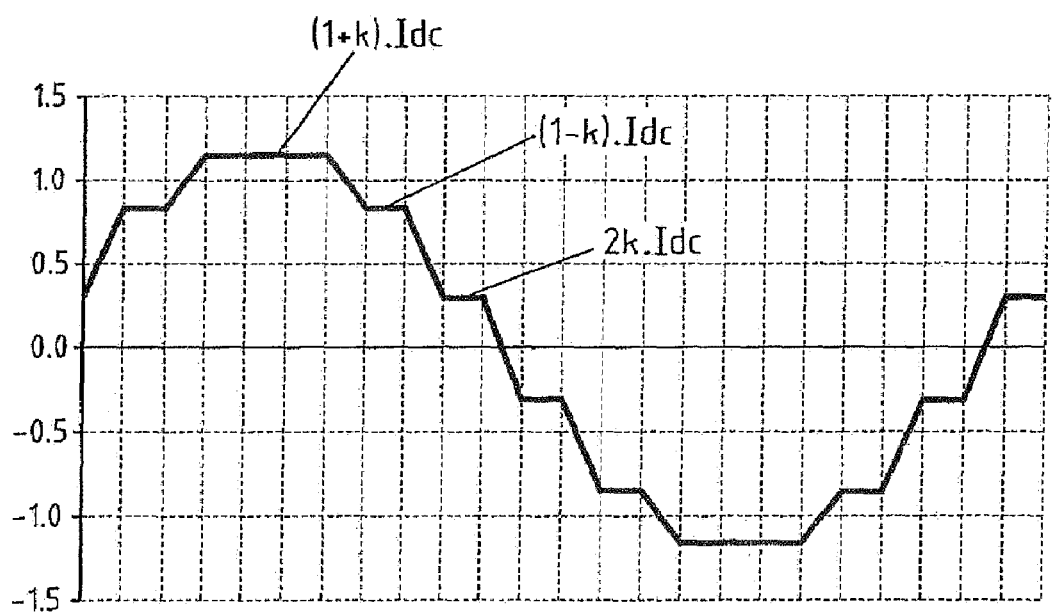

This effect can clearly be seen from a comparison of FIGS. 3A and 3B. FIG. 3A illustrates the development as a function of time of the current of a phase of the power supply network of a rectification stage of the prior art. The graph covers a period of the current. The current varies by rectangular steps along a line which is generally sinusoidal. The rectangular steps are separated by substantially vertical fronts. The maximum current is equal to approximately (1+k).Idc, where k is the transformation ratio and Idc is the current absorbed by the processing stage 20. The current in the region of the rectangular steps immediately below is equal to 1.Idc and, in the region of the rectangular steps which are further below, is (1+k)/2.Idc.

The shape of the portion of the line located below the X-axis is symmetrical relative to that located above the X-axis.

The transformation ratio k is defined as being the number of turns of the secondary windings 46A to C or 48A to C over the number of turns of the primary windings 4A to C.

k is, for example, $$\frac{\tan(\frac{\pi}{12})}{\sqrt{3}}$$

The current of FIG. 3A has a total harmonic distortion (THD) of approximately 15%. The THD is defined as follows:

$$THD = 100 \times \sqrt{\left[\sum_{n=2}^{\infty} H_n^2\right]} / H1$$

where H1 is the root mean square value of the rank 1 harmonic (fundamental harmonic) and Hn is the root mean square value of the harmonic of rank n.

FIG. 3B is a graph similar to that of FIG. 3A illustrating the development over time of the current of a phase of the power supply network of a rectification stage according to the invention. The current also varies in this instance per rectangular steps along to a line which is generally sinusoidal.

In contrast to FIG. 3A, however, the rectangular steps are separated by means of fronts which are inclined relative to the vertical and the levels of the current stages are different: (1+k).Idc, (1−k).Idc, 2k.Idc and the negative equivalents.

The THD is equal in this instance to 7.8% or approximately half of the THD of the current of FIG. 3A.

This result is achieved using a device of the passive type since the interphase inductors 51A and 51B are not controlled by the data processing unit 30 or by another computer.

Figure 4:
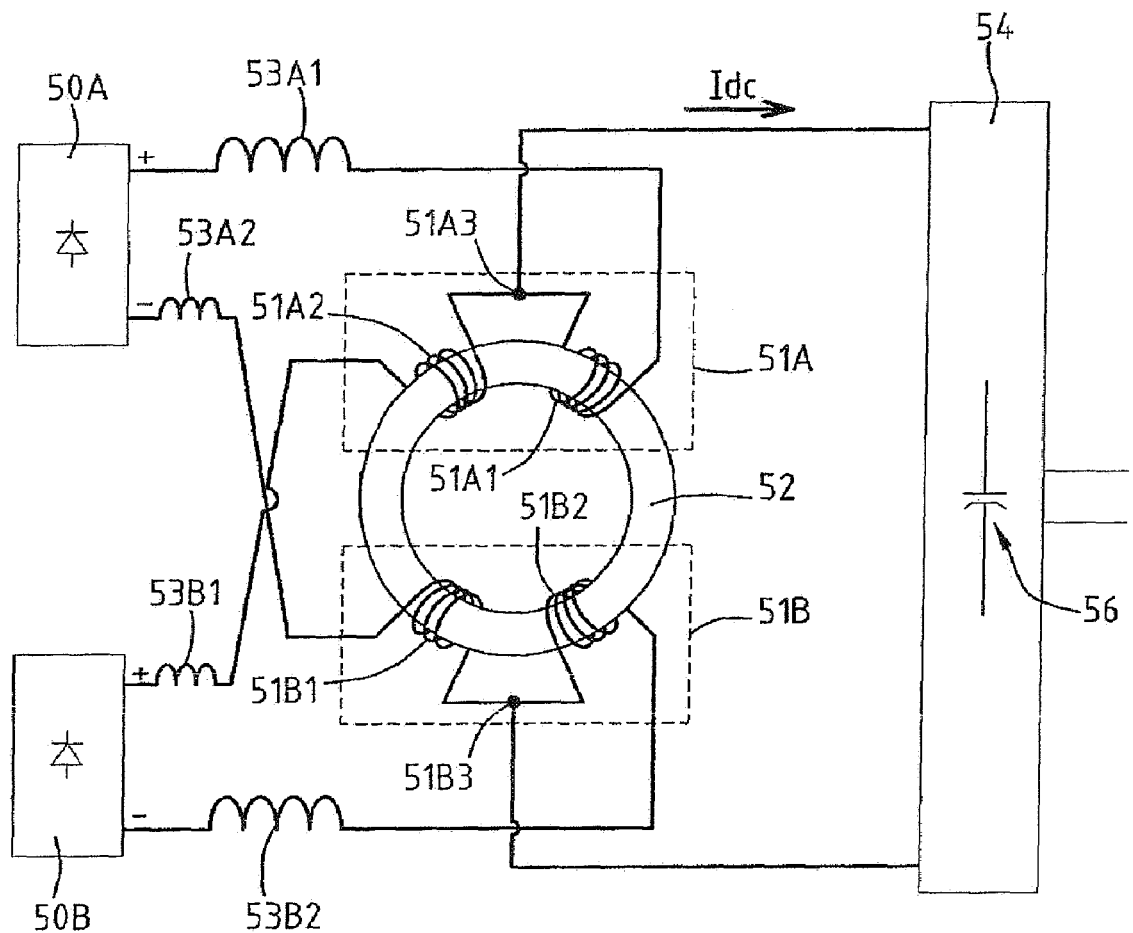
FIG. 4 is a view similar to that of FIG. 2 for a construction variant of the invention.

In a construction variant illustrated in FIG. 4, the rectification stage 18 comprises intermediate inductors 53A1, 53A2, 53B1 and 53B2 which are interposed between the input terminals of the interphase inductors 51A and 51B and the output terminals of the rectifiers 50A and 50B. These intermediate inductors may or may not be coupled together. They can be produced by using supplementary components or by acting on the stray impedance of the interface inductors 51A and 51B.

The intermediate inductors allow the mean square root value of the current to be reduced in the various windings of the transformer and the interphase inductors relative to the embodiment illustrated in FIGS. 1 and 2.

The invention claimed is:

1. Stage for rectifying a three-phase current, comprising:
   an autotransformer having pulsed flow for twelve-phase rectification and having, at an output, six phases which form a six-phase power supply network;
   two rectifiers, each of which is connected at the input to three separate phases of the six-phase power supply network and which each have two polarised output terminals,
   two interphase inductors having two input terminals which are connected to the output terminals of the two rectifiers having the same polarity and a centre output point each interphase inductor comprising two windings which are coupled magnetically and which are arranged so that the flows created by the continuous components of the currents which pass through these windings compensate for each other, two terminals of the windings being connected to each other in order to form the centre output point and the other two terminals constituting the input terminals; and
   a filtration stage which receives at the input the centre points of the two interphase inductors,
   characterised in that the two interphase inductors comprise a common core which defines a magnetic circuit and all the windings of the two interphase inductors are wound on this common core for the magnetic coupling thereof, and in that the windings of two separate interphase inductors are wound and connected so that the frequency of the flow in the magnetic circuit is equal to three times the frequency of the electrical network which supplies the rectification stage.

2. Stage according to claim 1, characterised in that the two interphase inductors are wound one around the other in accordance with the common core, the windings of the same inductor being interwoven.

3. Stage according to claim 1, characterised in that it comprises intermediate inductors which are interposed between the input terminals of the interphase inductors and the output terminals of the rectifiers.

4. Stage according to claim 2, characterised in that it comprises intermediate inductors which are interposed between the input terminals of the interphase inductors and the output terminals of the rectifiers.

5. Stage according to claim 3, characterised in that the intermediate inductors are produced using supplementary components or by acting on the stray impedance of the interface inductors.

6. Stage according to claim 4, characterised in that the intermediate inductors are produced using supplementary components or by acting on the stray impedance of the interface inductors.

7. Interface for supplying a load from an electrical power supply network comprising:
   a rectification stage according to claim 1; and
   a stage for processing the supply signal having an output for supplying the load, which stage for processing the supply signal comprises firstly a power module for processing the supply signal which is connected at the output of the rectification stage and secondly a control module which can bring about the control of the power module.

8. Transport means comprising an electrical power supply network and at least one load which is connected to the electrical power supply network via a supply interface according to claim 7.

* * * * *